(12) United States Patent
Rowland et al.

(10) Patent No.: US 11,446,740 B2
(45) Date of Patent: *Sep. 20, 2022

(54) MULTIPLE SEQUENTIAL LINEAR POWDER DISPENSERS FOR ADDITIVE MANUFACTURING

(71) Applicant: Applied Materials, Inc., Santa Clara, CA (US)

(72) Inventors: Christopher A. Rowland, Rockport, MA (US); Anantha K. Subramani, San Jose, CA (US); Kasiraman Krishnan, Milpitas, CA (US); Kartik Ramaswamy, San Jose, CA (US); Thomas B. Brezoczky, Los Gatos, CA (US); Swaminathan Srinivasan, Pleasanton, CA (US); Jennifer Y. Sun, Mountain View, CA (US); Simon Yavelberg, Cupertino, CA (US); Srinivas D. Nemani, Sunnyvale, CA (US); Nag B. Patibandla, Pleasanton, CA (US); Hou T. Ng, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 679 days.

This patent is subject to a terminal disclaimer.

(21) Appl. No.: 15/941,812

(22) Filed: Mar. 30, 2018

(65) Prior Publication Data

US 2018/0221948 A1    Aug. 9, 2018

Related U.S. Application Data

(63) Continuation of application No. 15/728,443, filed on Oct. 9, 2017, now abandoned, which is a continuation
(Continued)

(51) Int. Cl.
*B22F 10/30* (2021.01)
*B33Y 30/00* (2015.01)
(Continued)

(52) U.S. Cl.
CPC .............. *B22F 10/30* (2021.01); *B22F 12/22* (2021.01); *B23K 10/006* (2013.01);
(Continued)

(58) Field of Classification Search
CPC .......... B22F 10/30; B22F 12/22; B22F 12/38; B22F 12/41; B22F 12/63; B22F 12/55;
(Continued)

(56) References Cited

U.S. PATENT DOCUMENTS

| | | |
|---|---|---|
| 5,593,531 A | 1/1997 | Penn |
| 5,805,971 A | 9/1998 | Akedo |

(Continued)

FOREIGN PATENT DOCUMENTS

| | | |
|---|---|---|
| CN | 101553355 | 10/2009 |
| CN | 102164696 | 8/2011 |

(Continued)

OTHER PUBLICATIONS

Chinese Office Action in Chinese Application No. 201580038877.2, dated Aug. 1, 2018, 17 pages (with English translation).
(Continued)

*Primary Examiner* — John A Hevey
(74) *Attorney, Agent, or Firm* — Fish & Richardson P.C.

(57) ABSTRACT

An additive manufacturing system includes a platen to support an object to be fabricated, a dispenser assembly positioned above the platen, and an energy source configured to selectively fuse a layer of powder. The dispenser assembly includes a first dispenser, a second dispenser, and a drive system. The first dispenser delivers a first powder in a first linear region that extends along a first axis, and the
(Continued)

second dispenser delivers a second powder in a second linear region that extends parallel to the first linear region and is offset from the first linear region along a second axis perpendicular to the first axis. The drive system a drive system moves the support with the first dispenser and second dispenser together along the second axis.

11 Claims, 5 Drawing Sheets

Related U.S. Application Data of application No. 15/324,672, filed as application No. PCT/US2015/039609 on Jul. 8, 2015, now abandoned.

(60) Provisional application No. 62/183,522, filed on Jun. 23, 2015, provisional application No. 62/022,428, filed on Jul. 9, 2014.

(51) Int. Cl.

| | | |
|---|---|---|
| *B33Y 10/00* | (2015.01) | |
| *B29C 64/153* | (2017.01) | |
| *B22F 12/00* | (2021.01) | |
| *B33Y 50/02* | (2015.01) | |
| *B23K 10/00* | (2006.01) | |
| *B23K 10/02* | (2006.01) | |
| *B28B 1/00* | (2006.01) | |
| *B22F 10/10* | (2021.01) | |
| *B22F 12/55* | (2021.01) | |
| *B22F 12/63* | (2021.01) | |
| *B22F 12/41* | (2021.01) | |
| *B22F 3/105* | (2006.01) | |
| *H05B 3/00* | (2006.01) | |

(52) U.S. Cl.
CPC ............ *B23K 10/027* (2013.01); *B28B 1/001* (2013.01); *B29C 64/153* (2017.08); *B33Y 10/00* (2014.12); *B33Y 30/00* (2014.12); *B33Y 50/02* (2014.12); *H05B 3/0061* (2013.01); B22F 10/10 (2021.01); B22F 12/38 (2021.01); B22F 12/41 (2021.01); B22F 12/55 (2021.01); B22F 12/63 (2021.01); B22F 2003/1051 (2013.01); B22F 2998/10 (2013.01)

(58) Field of Classification Search
CPC .............. B22F 10/10; B22F 2003/1051; B22F 2998/10; B29C 64/153; B33Y 50/02; B33Y 10/00; B33Y 30/00; B23K 10/006; B23K 10/027; B28B 1/001; H05B 3/0061
See application file for complete search history.

(56) References Cited

U.S. PATENT DOCUMENTS

| | | | |
|---|---|---|---|
| 6,092,941 A | 7/2000 | Imai | |
| 6,143,378 A | 11/2000 | Harwell et al. | |
| 6,391,251 B1 | 5/2002 | Keicher | |
| 6,589,471 B1 | 7/2003 | Khoshnevis | |
| 6,641,778 B2 | 11/2003 | McGregor | |
| 6,811,744 B2 | 11/2004 | Keicher et al. | |
| 7,073,561 B1 | 7/2006 | Henn | |
| 7,077,638 B2 | 7/2006 | Leyden et al. | |
| 7,509,240 B2 | 3/2009 | Das et al. | |
| 7,658,976 B2* | 2/2010 | Kritchman | B29C 41/48 427/427.3 |
| 7,887,316 B2* | 2/2011 | Cox | B33Y 30/00 425/215 |
| 8,454,345 B2 | 6/2013 | Silverbrook | |
| 8,525,071 B2 | 9/2013 | Leuterer | |
| 8,753,105 B2 | 6/2014 | Scott | |
| 9,064,671 B2 | 6/2015 | Ljuagblad et al. | |
| 9,073,260 B2 | 7/2015 | El-Siblani et al. | |
| 9,505,057 B2 | 11/2016 | Nordkvist et al. | |
| 9,643,359 B2 | 5/2017 | Baumann et al. | |
| 9,764,515 B2 | 9/2017 | Yost et al. | |
| 10,350,824 B2* | 7/2019 | Ng | B29C 64/232 |
| 10,717,265 B2* | 7/2020 | Ng | B33Y 50/02 |
| 10,759,002 B2* | 9/2020 | Okada | B22F 10/20 |
| 2003/0074096 A1* | 4/2003 | Das | B29C 64/153 700/119 |
| 2004/0060639 A1 | 4/2004 | White | |
| 2004/0173945 A1 | 9/2004 | Koshnevis | |
| 2004/0251581 A1 | 12/2004 | Jang et al. | |
| 2005/0158107 A1 | 7/2005 | Acher | |
| 2005/0225007 A1 | 10/2005 | Lai et al. | |
| 2006/0035034 A1 | 2/2006 | Matsumoto et al. | |
| 2006/0225834 A1 | 10/2006 | Medina | |
| 2007/0122562 A1 | 5/2007 | Adams | |
| 2007/0179656 A1 | 8/2007 | Eshed et al. | |
| 2008/0250953 A1 | 10/2008 | Whelan | |
| 2009/0304952 A1 | 12/2009 | Kritchman | |
| 2010/0125356 A1* | 5/2010 | Shkolnik | G06T 5/006 700/98 |
| 2010/0310786 A1 | 12/2010 | Dunne | |
| 2011/0291331 A1* | 12/2011 | Scott | B23K 26/34 264/510 |
| 2012/0105534 A1 | 5/2012 | Boday et al. | |
| 2012/0201960 A1 | 8/2012 | Hartmann et al. | |
| 2012/0234802 A1 | 9/2012 | Wahl et al. | |
| 2013/0073068 A1 | 3/2013 | Napadensky | |
| 2013/0075033 A1 | 3/2013 | Chillscyzn et al. | |
| 2013/0105447 A1 | 5/2013 | Haake | |
| 2013/0283700 A1 | 10/2013 | Baja et al. | |
| 2014/0036455 A1* | 2/2014 | Napadensky | B33Y 50/02 361/748 |
| 2014/0061165 A1 | 3/2014 | Stempfer | |
| 2014/0314613 A1 | 10/2014 | Hopkinson et al. | |
| 2015/0174824 A1 | 6/2015 | Gifford et al. | |
| 2015/0190963 A1 | 7/2015 | Lee et al. | |
| 2015/0314530 A1* | 11/2015 | Rogren | B33Y 30/00 264/131 |
| 2017/0036404 A1 | 2/2017 | Rengers et al. | |
| 2017/0057013 A1 | 3/2017 | Gillespie et al. | |
| 2017/0203363 A1 | 7/2017 | Rowland et al. | |
| 2018/0221949 A1 | 8/2018 | Rowland et al. | |
| 2019/0389133 A1 | 12/2019 | Napadensky | |

FOREIGN PATENT DOCUMENTS

| | | |
|---|---|---|
| CN | 102463746 | 5/2012 |
| CN | 203390159 | 1/2014 |
| CN | 103717378 | 4/2014 |
| CN | 103747943 | 4/2014 |
| CN | 103802318 | 5/2014 |
| CN | 103802322 | 5/2014 |
| CN | 103842157 | 6/2014 |
| CN | 103917348 | 7/2014 |
| CN | 203937195 | 11/2014 |
| CN | 204018721 | 12/2014 |
| CN | 204235896 | 4/2015 |
| CN | 104708819 | 6/2015 |
| EP | 1631439 | 8/2007 |
| EP | 2391498 | 5/2013 |
| JP | H8-057967 | 3/1996 |
| JP | 118-297432 | 11/1996 |
| JP | 2002-103487 | 4/2002 |
| JP | 2003-048253 | 2/2003 |
| JP | 2004291625 | 10/2004 |
| JP | 2006-511365 | 4/2006 |
| JP | 2006-205456 | 8/2006 |
| JP | 2007-534524 | 11/2007 |
| JP | 2008-037024 | 2/2008 |
| JP | 04745867 | 8/2011 |
| JP | 2011-526222 | 10/2011 |
| JP | 2014-514193 | 6/2014 |
| JP | 2014-533210 | 12/2014 |

(56) References Cited

FOREIGN PATENT DOCUMENTS

| JP | 2015-525428 | 9/2015 |
|----|----|----|
| TW | 200533498 | 10/2005 |
| WO | WO 2013/003457 | 1/2013 |
| WO | WO 2013/021173 | 2/2013 |
| WO | WO 2014/068579 | 5/2014 |
| WO | WO 2014/144255 | 9/2014 |
| WO | WO 2015/031758 | 3/2015 |
| WO | WO 2015/038072 | 3/2015 |
| WO | WO 2015/103458 | 7/2015 |

OTHER PUBLICATIONS

Office Action in Taiwan Application No. 104122368, dated Jul. 3, 2019, 17 pages (with English Search Report).
International Search Report and Written Opinion in International Application No. PCT/US2015/039609, dated Oct. 12, 2015, 18 pages.
CN Office Action in Chinese Application No. 201580038877.2, dated Sep. 29, 2019, 10 pages (with English search report).
Gibson et al., "Additive manufacturing technologies: Rapid prototyping to direct digital manufacturing." Springer, 2010, 427 pages.
Office Action in Taiwanese Appln. No. 109102680, dated Jul. 1, 2021, 12 pages (with English search report).
Office Action in Japanese Appln. No. 2021-023958, dated Dec. 21, 2021, 8 pages (with English translation).
Office Action in Taiwanese Appln. No. 109102680, dated May 26, 2022, 9 pages (with English Search Report).

\* cited by examiner

Fig. 3C

MULTIPLE SEQUENTIAL LINEAR POWDER DISPENSERS FOR ADDITIVE MANUFACTURING

CLAIM OF PRIORITY

This application is a continuation of U.S. patent application Ser. No. 15/728,443, filed Oct. 9, 2017, which is a continuation of U.S. patent application Ser. No. 15/324,672, filed Jan. 6, 2017, which is a national phase application of PCT Application Serial No. PCT/US2015/039609, filed Jul. 8, 2015, which claims priority under 35 USC § 119(e) to U.S. Patent Application Ser. No. 62/022,428, filed on Jul. 9, 2014 and to U.S. Patent Application Ser. No. 62/183,522, filed on Jun. 23, 2015, each of which is incorporated by reference.

TECHNICAL FIELD

This present invention relates to additive manufacturing, also known as 3D printing.

BACKGROUND

Additive manufacturing (AM), also known as solid freeform fabrication or 3D printing, refers to any manufacturing process where three-dimensional objects are built up from raw material (generally powders, liquids, suspensions, or molten solids) in a series of two-dimensional layers or cross-sections. In contrast, traditional machining techniques involve subtractive processes and produce objects that are cut out of a stock material such as a block of wood, plastic or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders, to creating objects from smaller grains, e.g., powders using atomic diffusion. Sintering usually involves heating a powder. The powder used in sintering need not reach a liquid phase during the sintering process, in contrast to melting. When a powdered material is heated to a temperature below the melting point in a sintering process, the atoms in the powder particles diffuse across the boundaries of the particles, fusing the particles together to form a solid piece. As the sintering temperature does not have to reach the melting point of the material, sintering is often used for materials with high melting points such as tungsten and molybdenum.

Both sintering and melting can be used in additive manufacturing. The material being used determines which process occurs. An amorphous solid, such as acrylonitrile butadiene styrene (ABS), is actually a supercooled viscous liquid, and does not actually melt; as melting involves a phase transition from a solid to a liquid state. Thus, selective laser sintering (SLS) is the relevant process for ABS, while selective laser melting (SLM) is used for crystalline and semi-crystalline materials such as nylon and metals, which have a discrete melting/freezing temperature and undergo melting during the SLM process.

Conventional systems that use a laser beam as the energy source for sintering or melting a powdered material typically direct the laser beam on a selected point in a layer of the powdered material and selectively raster scan the laser beam to locations across the layer. Once all the selected locations on the first layer are sintered or melted, a new layer of powdered material is deposited on top of the completed layer and the process is repeated layer by layer until the desired object is produced. As the density of the finished object depends on the peak laser power and not on the duration of the laser irradiation, conventional systems typically use a pulsed laser.

An electron beam can also be used as the energy source to cause sintering or melting in a material. Once again, the electron beam needs to be raster scanned across the layer to complete the processing of a particular layer.

SUMMARY

In one aspect, an additive manufacturing system includes a platen, a feed material dispenser apparatus configured to deliver a first feed material onto the platen in a pattern specified by a computer aided design program to form a layer of the feed material on the platen, a heat source configured to apply heat to all of the layer of feed material simultaneously; and a controller configured to cause the heat source to raise a temperature of all of the layer of feed material simultaneously to a temperature sufficient to cause the first feed material to fuse.

In another aspect an additive manufacturing system includes a platen, a feed material dispenser apparatus configured to deliver a first feed material onto the platen in a pattern specified by a computer aided design program to form a layer of feed material on the platen, a heat source configured to apply heat simultaneously to a region of the layer of feed material extending across a width of the platen and to scan the region across a length of the platen; and a controller configured to cause the heat source to raise a temperature of the region of the layer of feed material simultaneously to a temperature sufficient to cause the first feed material to fuse.

In another aspect, an additive manufacturing system, the system includes a platen, a feed material delivery system configured to deliver feed material to a location on the platen specified by a computer aided design program, and a heat source configured to raise a temperature of the feed material at two or more locations on the platen simultaneously.

In another aspect, a method of additive manufacturing includes dispensing a layer of feed material on a platen, the layer of feed material including a first plurality of cells formed of a first feed material and a second plurality of cells formed of a second feed material. The first feed material has a first sintering or melting temperature and the second feed material has having a different second sintering or melting temperature, and the method includes heating all of the layer of feed material simultaneously to a temperature above the first sintering or melting temperature and below the second sintering or melting temperature.

In another aspect, a method of additive manufacturing includes dispensing a layer of feed material on a platen, the layer of feed material including a first plurality of cells formed of a first feed material and a second plurality of cells formed of a second feed material. The first feed material has a first sintering or melting temperature and the second feed material has having a different second sintering or melting temperature. The method includes simultaneously heating a region of the layer of feed material that extends across a width of the platen to a temperature above the first sintering or melting temperature and below the second sintering or melting temperature, and scanning the region across a length of the platen.

In another aspect, an additive manufacturing system includes a platen, a feed material dispenser apparatus configured to deliver a feed material onto the platen in a pattern specified by a computer aided design program to form a layer of the feed material on the platen, and a plasma source configured to generate an electrical potential in all of the layer of feed material simultaneously, the electrical potential being sufficient to cause fusing of the feed material.

In another aspect, an additive manufacturing system includes a platen, a feed material dispenser assembly configured to deliver a first feed material over the platen in a pattern specified in a computer-readable medium to form a layer of feed material over the platen, a heat source configured to apply heat to all of the layer of feed material simultaneously, and a controller configured to cause the heat source to raise a temperature of all of the layer of feed material simultaneously to a temperature sufficient to cause the first feed material to fuse.

In another aspect, a method of additive manufacturing includes dispensing a layer of a first feed material over a platen in a pattern specified in a computer-readable medium, and heating all of the layer of feed material simultaneously above a temperature at which the first feed material fuses.

Implementations of either the above system or method can include one or more of the following features.

The heat source may include an array of heat lamps configured to heat all of the layer simultaneously. The array of heat lamps may be positioned directly above the platen. The heat source may include a plasma source. The plasma source may be configured to cause charged particles to bombard the layer of feed material. Th plasma source may be configured to generate an electrical potential in portions of the layer of feed material simultaneously, the electrical potential being sufficient to cause fusing of the first feed material. The system may include a secondary heat source configured to raise the layer of feed material to a temperature below a temperature at which the first feed material fuses. The secondary heat source may include a resistive heater embedded in the platen. The controller may be configured to cause the heat source to apply heat to all of the layer of feed material simultaneously after the secondary heat source heats the layer of feed material.

The feed material delivery system may include a first dispenser configured to dispense the first feed material and a second dispenser configured to dispense a second feed material, the layer of feed material comprising the first material and the second material. The first feed material may fuse at a first temperature and the second feed material may fuse at a second temperature that is higher than the first temperature. The controller may be is configured to cause the heat source to raise the temperature of the layer of feed material simultaneously to a temperature below the second temperature. The first dispenser and the second dispenser may each include a gate that is individually controllable and the gate may be configured to release respective first or second feed material at locations on the platen according to the pattern specified in the computer-readable medium. The gate may be a piezoelectric printhead, a pneumatic valve, a microelectromechanical systems (MEMS) valve, a solenoid valve or a magnetic valve. The system may include a second heat source in the platen. The controller may be configured to cause the second heat source to maintain a base temperature of the platen at an elevated temperature lower than both the first and second temperature.

The heat source may be positioned on a same side of the platen as the dispenser and be configured to apply radiant heat to all of the layer simultaneously. The heat source may be spaced from the platen sufficiently for the dispenser to pass between the heat source and the platen. The heat source may include an array of heat lamps configured to heat all of the layer simultaneously. The heat source may be positioned on a side of the platen farther from the dispenser. The heat source may be embedded in the platen and be configured to apply conductive heat to the layer.

The feed material delivery system may include a line of dispensers configured to deliver a line of feed material simultaneously. The line of dispensers may be configured to be translated across the platen to deliver a layer of feed material. The feed material delivery system may include a two dimensional array of dispensers configured to deliver all of the layer simultaneously. A piston may be configured to actuate the platen vertically. The controller may be configured to cause the piston to be lowered after a layer of feed material has been heated and prior to the feed material delivery system delivering a second layer of feed material above the layer of feed material that has been heated.

In another aspect, an additive manufacturing system includes a platen, a feed material dispenser apparatus configured to deliver a first feed material over the platen in a pattern specified in a computer-readable medium to form a layer of feed material over the platen, a heat source configured to apply heat simultaneously to a region of the layer of feed material extending across a width of the platen and to scan the region across a length of the platen, and a controller configured to cause the heat source to raise a temperature of the region of the layer of feed material simultaneously to a temperature sufficient to cause the first feed material to fuse.

In another aspect, a method of additive manufacturing includes dispensing a layer of feed material over a platen in a pattern specified in a computer-readable medium, simultaneously heating a region of the layer of feed material that extends across a width of the platen to a temperature above the first sintering or melting temperature and below the second sintering or melting temperature, and scanning the region across a length of the platen.

Implementations of either the above system or method can include one or more of the following features.

The region may be substantially linear, and the heat source may be configured to scan the region in a direction perpendicular to a primary axis of the region. The heat source may include a laser to generate a laser beam and optics may receive the laser beam and expand a cross section of the laser beam along the width of the platen. The optics may include a beam expander and a cylindrical lens. A mirror galvanometer to cause the region to scan across the length of the platen. The heat source may include a linear array of heat lamps. An actuator may be coupled to at least one of the heat source or platen to cause the region to scan across the length of the platen. A secondary heat source may be configured to raise the layer of feed material to a temperature below a temperature at which the first feed material fuses. The secondary heat source may include a resistive heater embedded in the platen.

The feed material delivery system may include a first dispenser configured to dispense the first feed material and a second dispenser configured to dispense a second feed material, so that the layer of feed material includes the first material and the second material. The first feed material may fuses at a first temperature and the second feed material may fuses at a second temperature higher than the first temperature. The controller may be configured to cause the heat source to raise the temperature of the layer of feed material simultaneously to a temperature below the second temperature. A second heat source may be located in the platen, and the controller may be configured to cause the second heat source to maintain a base temperature of the platen at an elevated temperature lower than both the first and second temperature.

In another aspect, an additive manufacturing system includes a platen, a feed material dispenser apparatus configured to deliver a first feed material over the platen, and a plasma source configured to generate a plasma that causes fusing of the first feed material.

In another aspect, a method of additive manufacturing includes dispensing a layer of feed material over a platen, and generating a plasma that causes fusing of the first feed material.

Implementations of either the above system or method can include one or more of the following features.

The plasma source may include two electrodes and a power source to supply a radio frequency voltage to at least one of the two electrodes. A first electrode of the two electrodes may be in or on the platen. A second electrode of the two electrodes may be suspended above the platen. The power supply may be configured to supply a radio frequency voltages having a first frequency to one of the two electrodes, and to supply a radio frequency voltage having a second frequency to the other one of the two electrodes, with the first frequency different from the second frequency.

The platen may be supported in a chamber, e.g., a vacuum chamber. A gas inlet may be configured to introduce a gas into the chamber. The gas may be configured to form ions, and the power source may be configured drive the electrodes at a power and frequency such that the ions are caused to be embedded into the layer.

The plasma source may be configured to generate a plasma that extends across the platen and raise all of the layer of feed material simultaneously to a temperature sufficient to cause the first feed material to fuse. The dispenser may be configured to deliver the first feed material in a pattern specified in a computer-readable medium.

The feed material delivery system may include a first dispenser configured to dispense the first feed material and a second dispenser configured to dispense a second feed material, so that the layer of feed material includes the first material and the second material. The first feed material may fuse at a first temperature and the second feed material may fuses at a second temperature that is higher than the first temperature. The plasma source may be configured to generate plasma that does not cause fusing of the second feed material. A second heat source may be configured raise the layer of feed material to an elevated temperature lower than both the first and second temperature.

In another aspect, an additive manufacturing system includes a platen, a feed material dispenser apparatus to dispense a layer of feed material over the platen, a heat source, and a controller. The feed material dispenser apparatus includes a first dispenser configured to dispense a first feed material and a second dispenser configured to dispense a second feed material, such that the layer of feed material comprises the first feed material and the second feed material. The first feed material may fuses at a first temperature and the second feed material may fuses at a higher second temperature. The a heat source may be configured to heat to the layer of feed material to a temperature sufficient to cause the first feed material to fuse but insufficient to cause the second feed material to fuse. The controller may be configured to cause the dispenser to dispense the first feed material in a pattern specified in a computer-readable medium.

Implementations may include one or more of the following features. The controller may be configured to cause the feed material dispenser to dispense one of either the first feed material or the second configured at each voxel in the layer of feed material. The heat source may be configured to heat all of the layer of feed material to the temperature simultaneously. The first dispenser and the second dispenser may each include a gate that is individually controllable, and the gate may be configured to release respective first or second feed material at locations on the platen according to the pattern specified in the computer-readable medium. The gate may include an element selected from the group consisting of a piezoelectric printhead, a pneumatic valve, a microelectromechanical systems (MEMS) valve, a solenoid valve and a magnetic valve.

In another aspect, an additive manufacturing system includes a platen, a feed material dispenser apparatus to dispense a layer of feed material over the platen, a heat source and a controller. The feed material dispenser apparatus includes a first dispenser configured to dispense a first feed material and a second dispenser configured to dispense a second feed material, such that the layer of feed material comprises the first feed material and the second feed material. The first feed material fuses at a first temperature and the second feed material fuses at a higher second temperature. The heat source is configured to apply heat to all of the layer of feed material simultaneously. The controller is configured to cause the dispenser to dispense the first feed material in a pattern specified in a computer-readable medium and to cause the heat source to raise a temperature of all of the layer of feed material simultaneously to a temperature above the first temperature and below the second temperature.

In another aspect, a method of additive manufacturing includes dispensing a layer of feed material on a platen, the layer of feed material including a first plurality of cells formed of a first feed material and a second plurality of cells formed of a second feed material, wherein the first feed material fuses at a first temperature and the second feed material fuses at a different second temperature, and heating all of the layer of feed material simultaneously to a temperature above the first temperature and below the second temperature.

Implementations can provide one or more of the following advantages. The number and size of thermal fluctuations experience by the material can be reduced. Material properties of the fabricated object can be more spatially uniform. The time needed to fabricate an object can be reduced. For example, for a cube having a length L, the time needed to fabricate the cube can scale as L or $L^2$ rather than $L^3$.

The details of one or more embodiments of the invention are set forth in the accompanying drawings and the description below. Other aspects, features, and advantages of the invention will be apparent from the description and drawings, and from the claims.

DESCRIPTION OF DRAWINGS

Like reference symbols in the various drawings indicate like elements.

DETAILED DESCRIPTION

A point on a layer of a powdered material that is being sintered or melted by a pulsed laser beam experiences a series of abrupt temperature fluctuations as the laser beam delivers energy to locations in the vicinity of that point during raster scanning. When a new layer of powdered material is deposited over a completed layer, the same point on the completed layer experiences another series of abrupt temperature fluctuation as heat deposited by the pulsed laser beam is conducted from the top layer to the completed layer. Such temperature fluctuations can cause changes in temperature of more than 1500° C. at a particular point in the layer and can repeat every 2-3 second, depending on the scan rate of the laser beam.

The large temperature fluctuations caused by the point-by-point sintering or melting of a powdered material can create thermal stresses within the printed object. Furthermore, material properties, such as the grain size of the sintered material may vary due to variations in the thermal history at different locations in the finished object. For example, the increase in temperature may cause localized regions of the sintered or melted portion to recrystallize and form a region that has a different grain size from a neighboring region. In order to obtain more repeatable material properties in the fabricated object, better control of grain size is desired.

The time needed to fabricate objects using point-to-point sintering or melting techniques scales with the third power of a linear dimension of the object. For example, for a cube having a length L, the time needed to fabricate the cube would scale as $L^3$.

Figure 1A:
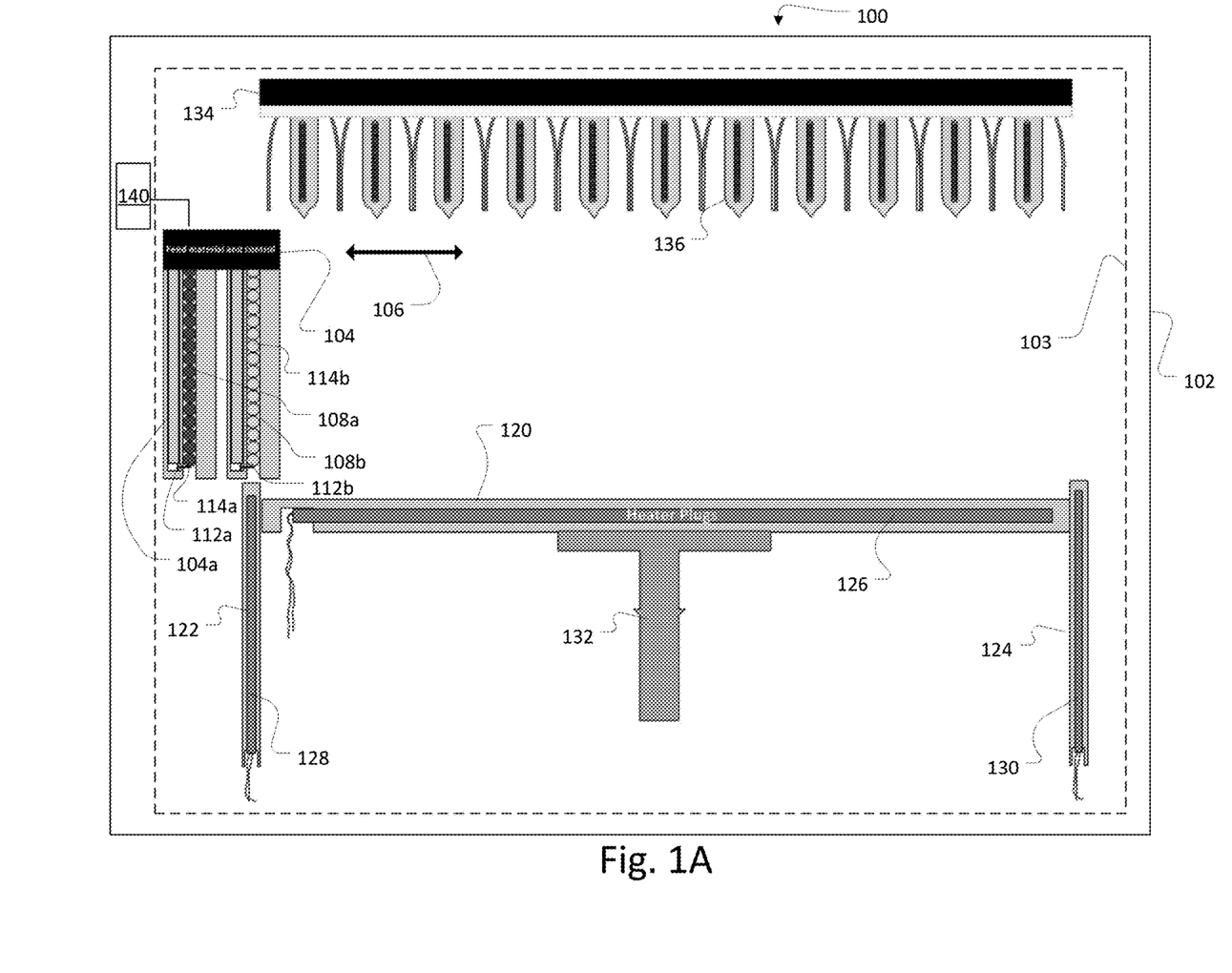
FIG. 1A is a schematic view of an additive manufacturing system.

FIG. 1A shows a schematic of an exemplary additive manufacturing system 100. The system 100 includes and is enclosed by a housing 102. The housing 102 can, for example, allow a vacuum environment to be maintained in a chamber 103 inside the housing, but alternatively the interior of the chamber 103 can be a substantially pure gas or mixture of gases, e.g., a gas or mixture of gases that has been filtered to remove particulates, or the chamber can be vented to atmosphere. The vacuum environment or the filtered gas can reduce defects during manufacture of a part. For some implementations, the chamber 103 can be maintained at a positive pressure, i.e., above atmospheric pressure. This can help prevent the external atmosphere from entering the chamber 103.

The additive manufacturing system 100 includes a material dispenser assembly 104 positioned above a platen 120. A vertical position of the platen 120 can be controlled by a piston 132. After each layer of powder has been dispensed and fused, the piston 132 can lower the platen 120 and any layers of powder thereon, by the thickness of one layer, so that the assembly is ready to receive a new layer of powder.

The platen 120 can be sufficiently large to accommodate fabrication of large-scale industrial parts. For example, the platen 120 can be at least 500 mm across, e.g., 500 mm by 500 mm square. For example, the platen can be at least 1 meter across, e.g., 1 meter square.

A controller 140 controls a drive system (not shown), e.g., a linear actuator, connected to the dispenser assembly 104. The drive system is configured such that, during operation, the dispenser assembly is movable back and forth parallel to the top surface of the platen 120 (along the direction indicated by arrow 106). For example, the dispenser assembly 104 can be supported on a rail that extends across the chamber 103. Alternatively, the dispenser assembly 104 could be held in a fixed position, while the platen 120 is moved by the drive system.

As the dispenser assembly 104 scans across the platen, the dispenser assembly 104 deposits feed materials at an appropriate location on the platen 120. The dispenser assembly 104 can store and dispense two or more different feed materials. The dispenser assembly includes a first dispenser 104a having a first reservoir 108a to hold first feed material 114a, and a second dispenser 104b having a second reservoir 108b to hold a second feed material 114b. Release of the first feed material 114a and second feed material 114b is controlled by a first gate 112a and a second gate 112b, respectively. Gates 112a and 112b are controlled independently so that one of the two feed materials is deposited at a particular location on the platen 120.

The controller 140 directs the dispenser assembly 104 to deposit either the first feed material 114a or the second feed material 114b at locations on the platen according to a printing pattern that can be stored in non-transitory computer-readable medium. For example, the printing pattern can be stored as a file, e.g., a computer aided design (CAD)-compatible file, that is then read by a processor associated with the controller 140. Electronic control signals are then sent to the gates 112a and 112b to dispense the respective feed material when the respective dispensers 104a and 104b are translated to a position specified by the CAD-compatible file.

In some implementations, each dispenser 104a, 104b includes a plurality of openings through which feed material can be dispensed. Each opening can have an independently controllable gate, so that delivery of the feed material through each opening can be independently controlled.

In some implementations, the plurality of openings extend across the width of the platen, e.g., in direction perpendicular to the direction of travel 106 of the dispensers 104a, 104b. In this case, in operation, the dispensers 104a, 104b can scan across the platen 120 in a single sweep in the direction 106. In some implementations, for alternating layers the dispensers 104a, 104b can scan across the platen 120 in alternating directions, e.g., a first sweep in the direction 106 and a second sweep in the opposite direction.

Alternatively, e.g., where the plurality of openings do not extend across the width of the platen, the dispensing system 104 can be configured such that the dispensers 104a, 104b move in two directions to scan across the platen 120, e.g., a raster scan across the platen 120, to deliver the material for a layer.

The gates 112a, 112b of the dispensers 104a, 104b can be provided by a piezoelectric printhead, and/or one or more of pneumatic valves, microelectromechanical systems (MEMS) valves, solenoid valves, or magnetic valves, to control the release of feed material from the each dispenser 104a, 104b. The dispensers 104a, 104b can deposit a selected feed material at selected locations on the platen 120. The higher the spatial resolution of the voxels, the smaller the volume of the voxels and thus the lower the quantity of feed material that would be dispensed per voxel.

The feed material can be dry powders of metallic or ceramic particles, metallic or ceramic powders in liquid suspension, or a slurry suspension of a material. For example, for a dispenser that uses a piezoelectric printhead, the feed material would typically be particles in a liquid suspension. For example, either or both dispensers 104a, 104b can deliver their powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

Examples of metallic particles include metals, alloys and intermetallic alloys. Examples of materials for the metallic particles include titanium, stainless steel, nickel, cobalt, chromium, vanadium, and various alloys or intermetallic alloys of these metals. Examples of ceramic materials include metal oxide, such as ceria, alumina, silica, aluminum nitride, silicon nitride, silicon carbide, or a combination of these materials.

Optionally, the system 100 can include a compaction and/or levelling mechanism to compact and/or smooth the layer of feed materials deposited over the platen 120. For example, the system can include a roller or blade that is movable parallel to the platen surface by a drive system, e.g., a linear actuator. The height of the roller or blade relative to the platen 120 is set to compact and/or smooth the outermost layer of feed material. The roller can rotate as it translates across the platen.

Figure 1B:
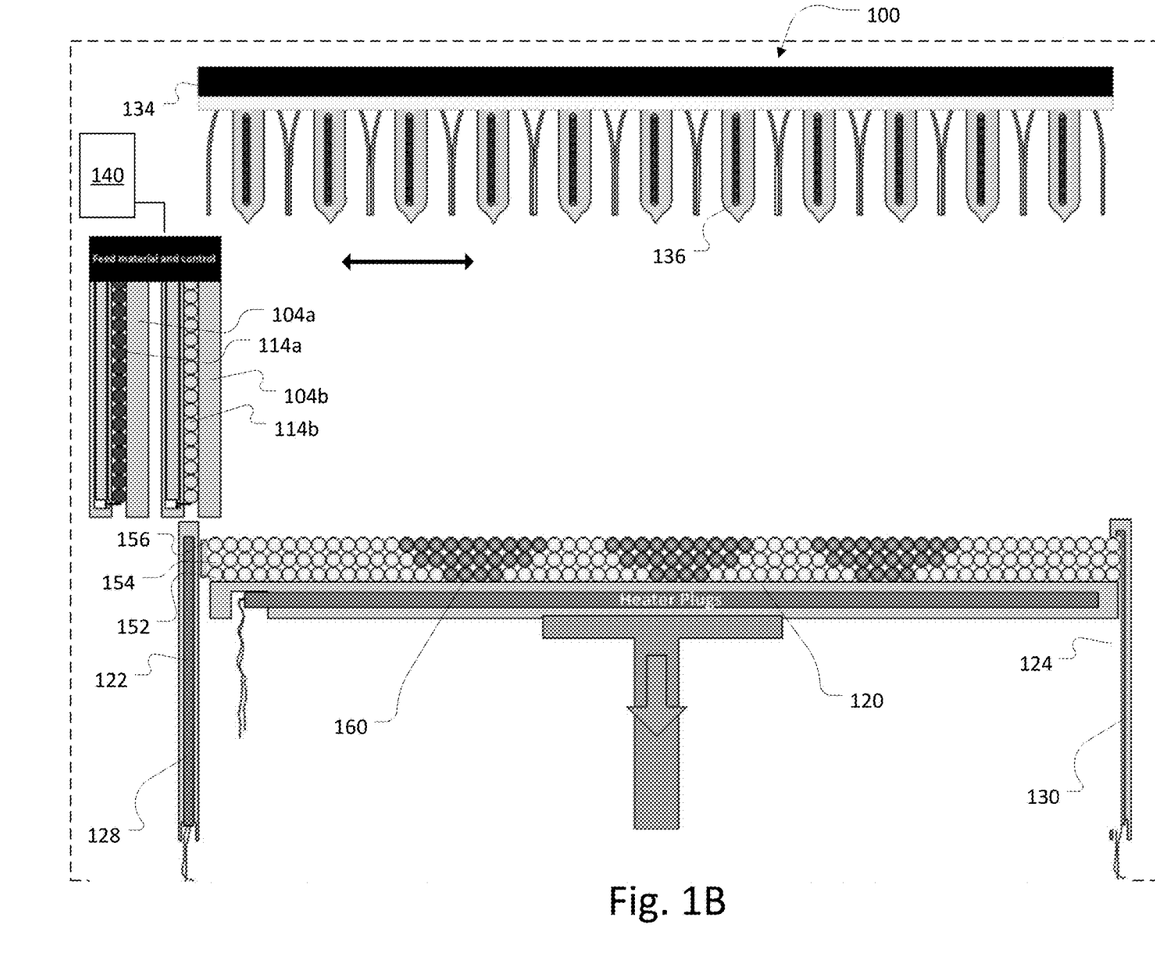
FIG. 1B is a schematic view of the additive manufacturing system after a few layers of material have been fabricated.

During manufacturing, layers of feed materials are progressively deposited and sintered or melted. For example, the first and second feed materials 114a and 114b are dispensed from the dispenser assembly 104 to form a first layer 152 that contacts the platen 120, as shown in FIG. 1B. Subsequently deposited layers of feed material can form additional layers, e.g., layers 154 and 156, each of which is supported on an underlying layer, e.g., layer 154 and 152, respectively.

After each layer is deposited, the outermost layer is processed to cause at least some of the layer to fuse, e.g., by sintering or by melting and resolidifying.

The second feed material 114b can have a higher sintering or melting point than the first feed material 114a. For example, the temperature difference in melting point between the first feed material 114a and the second feed material 114b may be greater than 200° C.

The system 100 includes a heat source 134 configured to raise the temperature of an entire deposited layer simultaneously. In operation, the heat source 134 raises the temperature of the whole outermost layer 156 to a temperature that is above a first temperature at which the first feed material 114a fuses, but below above a second temperature at which the second feed material 114b fuses. Consequently, a deposited cluster of the first feed material 114a can melt and thus fuse together to form fused material 160, whereas the second feed material 114b remains in loose (e.g., powder) form. The heat source 134 can be a radiative heater. For example, the heat source 134 can be a two-dimensional array of heat lamps 136.

The heat source 134 can be triggered after each layer has been deposited by the dispensing system 104. In contrast to a point-by-point raster scan, in which the time needed to fuse the material in an object scales as $L^3$, the time needed to fuse the material in the object using system 100 scales with L, the thickness (i.e., the number of layers) of the object. This permits a significant increase in throughput, and may make additive manufacturing economically feasible over a wider range of products or at larger sizes.

As illustrated in FIGS. 1A and 1B, the heat source 134 can be positioned "above" the platen, i.e., on the same side of the platen 120 on which the feed material is deposited, and spaced away sufficiently from the platen 120 so that the dispensers 104a, 104b can pass between the platen 120 and the heat source 134. As shown in FIGS. 1A and 1B, the array of heat lamps 136 is disposed directly above the platen 120, and the heat lamps 136 are arranged in a plane parallel to the surface of the platen 120 with the individual lamps oriented perpendicular to the platen surface. However, the heat lamps 136 could be above the platen but partially or entirely off to the lateral sides of the platen, with the lamps oriented at angle such that the heat radiation is at a non-zero angle of incidence on the layer of feed material on the platen.

In some implementations the heat source 134 could be positioned "below" the platen, i.e., on the side of the platen 120 opposite the surface on which the feed material is deposited. However, having the heat source 134 above the platen is advantageous in that the heat can be delivered primarily to the outermost layer, e.g., layer 156, rather than transmitting heat to the platen and underlying layers 152, 154.

A secondary heat source can be used to raise the temperature of the layer of feed material(s) to a temperature below the temperature at which the first feed material fuses. In general, the secondary heat source applies heat to the outermost layer 156 of feed material before the heat source 134. For example, the secondary heat source could be operated continuously, e.g., while the layer is being deposited. For example, the platen 120 can be heated by an embedded heater 126 to a base temperature that is below the melting points of both the first and second feed materials. As another example, additional heat lamps could provide the secondary heat source.

The heat source 134 is triggered to impart sufficient energy to sinter or melt the first feed material without sintering or melting the second feed material. In this way, the heat source 134 can be configured to provide a smaller temperature increase to the deposited material to selectively melt the first feed material. Transitioning through a small temperature difference can enable each deposited layer of feed materials to be processed more quickly. Transitioning through a small temperature difference can also reduce thermal stress and thus improve quality of the fabricated object. For example, the base temperature of the platen 120 can be about 500-1700° C., e.g., 1500° C., and the heat source 134 can be triggered to impart energy to cause a temperature increase of about 50° C.

For example, considering the case of titanium, which has a melting point of 1668° C., heat of fusion of 14.15 kJ/mol, a molar heat capacity of 25.06 J /mol/K and a density of 4.506 g/cm$^3$. Assuming the feed material is titanium spheres having a diameter of 10 microns, the energy needed to raise one titanium sphere by 50° C. and melt it is ~0.7 µJ. Assuming heating a square area having sides of 10 cm on the platen 120 for 1 second using the heat lamps each time they are used to melt a layer having a thickness of a single sphere, the array of heat lamps 136 can have a power rating of at least ~75 W, assuming all the energy from the heat lamps is absorbed by the titanium spheres. In other words, reflection and scattering of the thermal radiation from the heater lamps have not been taken into account above.

In contrast, without the base temperature of the platen been maintained at, for example, 50° C. below the melting point of the first feed material, the power rating of the array 134 would have to be at least ~270 W to raise the temperature of the first feed material from room temperature to the melting point of the material and to melt the material.

Alternatively, the heat source 134 could be used to heat the platen 120 to the base temperature, and the embedded heater 126 could be triggered to impart sufficient energy to melt the first feed material without melting the second feed material. However, having the heat source 134 be triggered is advantageous in that the change in temperature can occur primarily in the outermost layer, e.g., layer 156, rather than having to propagate through the platen and underlying layers 152, 154.

As shown in FIG. 1B, the platen 120 can include side walls 122 and 124 that are each heated by heaters 128 and 130, respectively.

In some implementations, rather than the heat source 134 can be configured to raise the temperature of a generally linear region that extends across the platen. The heated region can be scanned linearly across the platen, e.g., in a direction perpendicular to the primary axis of the linear region (i.e., assuming the length is greater than the width, the primary axis is the length direction). In such a system, the time needed to fuse the material in an object scales as $L^2$ rather than $L^3$. The heat source 134 can include a laser beam that is appropriately shaped, for example, using cylindrical lenses, to achieve a line shape. When a line of laser beam is used, the laser beam would be scanned across the platen to cover an entire layer of deposited feed material. Alternatively or in addition, the heat source 134 could include a linear array of heat lamps.

Relative motion of the linear region heated by the heat source 134 across the outermost layer of feed material can be accomplished by holding the platen 120 fixed while the heat source 134 moves, e.g., with a linear actuator, by holding the heat source 134 stationary while the platen 120 moves, e.g., with a linear actuator, or by scanning the beam generated by the heat source, e.g., by a mirror galvanometer.

In operation, after each layer has been deposited and heat treated, the platen 120 is lowered by an amount substantially equal to the thickness of layer. Then the dispenser assembly 104, which does not need to be translated in the vertical direction, scans horizontally across the platen to deposit a new layer that overlays the previously deposited layer, and the new layer can then be heat treated to fuse the first feed material. This process can be repeated until the full 3-dimensional object is fabricated. The fused material 160 derived by heat treatment of the first feed material provides the additively manufactured object, and the loose second feed material 114b can be removed and cleaned off after the object is formed.

As noted above, the first feed material 114a and the second feed material 114b are deposited in each layer by the dispenser assembly 104 in a pattern stored in a 3D drawing computer program controlled by the controller 140. For some implementations, the controller 140 controls the dispenser assembly 104 so that each voxel in a layer is filled by one of the feed materials, e.g., there are no empty voxels. For example, assuming that two feed materials are used, any voxel in to which the first dispenser 104a does not deliver the first feed material 114a, the second dispenser 104b will deliver the second feed material 114b. This can ensure that each voxel in subsequently dispensed layers will be supported by an underlying material.

Using a heat source that raises the temperature of the entire layer simultaneously, e.g., 2-dimensional array of heater lamps, allows layerwise heating of the feed materials, speeding up the fabrication process. In addition, the entire layer of feed material is exposed to the heat from the array of heater lamps at the same time, which can provide better control to the thermal history across the layer. In particular, the number of fluctuations of temperature experienced by a particular point in the layer can be reduced. As a result, better control of grain sizes of the fused material can be achieved.

Figure 2A:
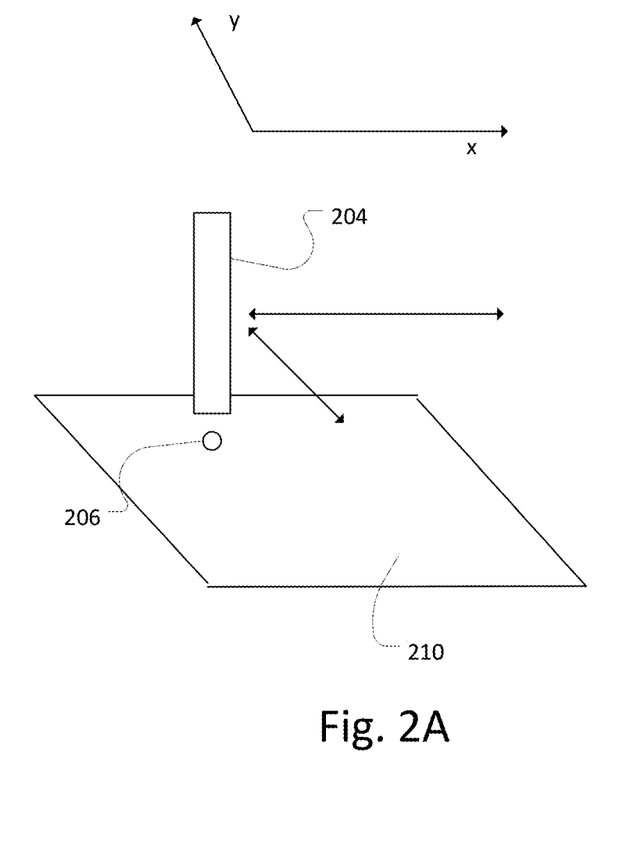
FIG. 2A is a schematic view of a point dispenser.

As shown in FIG. 2A, a dispenser 204, which could be used for the dispenser 104a and/or 104b, may be a single point dispenser and the dispenser would be translated across the x and y direction of the platen 210 to deposit a complete layer of feed material 206, which can be feed material 114a and/or feed material 114b, on the platen 210.

Figure 2B:
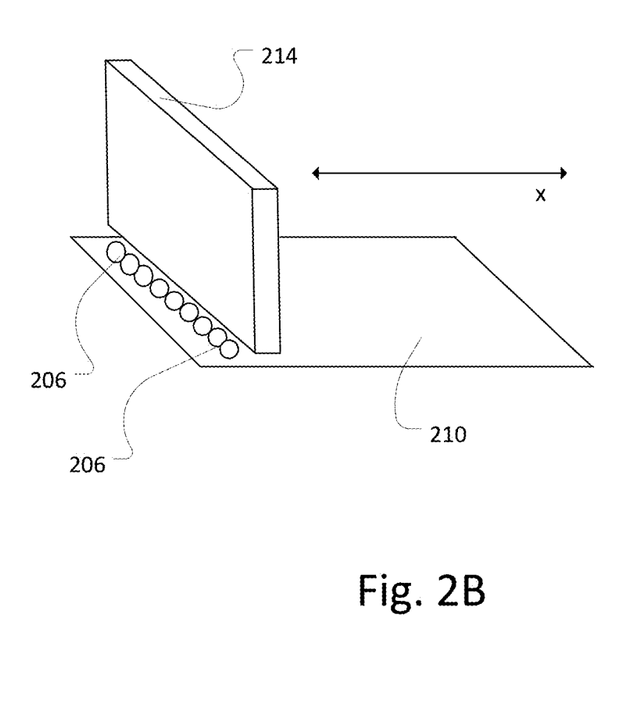
FIG. 2B is a schematic view of a line dispenser.

Alternatively, as shown in FIG. 2B, a dispenser 214, which could be used for the dispenser 104a and/or 104b, can be a line dispenser that extends across the width of the platen. For example, the dispenser 214 could include a linear array of individually controllable openings, e.g., nozzles. The dispenser 214 can be translated only along one dimension to deposit a complete layer of feed material on the platen.

Alternatively, as shown in FIG. 1C, a dispenser 224, which could be used for the dispenser 104a and/or 104b, includes a two-dimensional array of individually controllable openings, e.g., nozzles. For example, the dispenser 224 can be a large area voxel nozzle print (LAVoN). LAVoN 224 allows a complete two dimensional layer of feed material to be deposited simultaneously. LAVoN 224 may be a dense grid of through-silicon via (TSV) 228 formed in bulk silicon 226. Each TSV 228 can be controlled by a piezoelectric gate 230 that closes an exit opening of a particular 228 when an appropriate voltage is applied such that the feed material 206 is retained within the TSV. When a different voltage is applied to the TSV 228, the piezoelectric gate 230 can open an exit opening of a particular TSV 228, allowing feed material to be deposited on a platen. Each of the TSV 228 in the LAVoN 224 is individually accessed by control signals produced from a controller based on a CAD-file that defines the fabricated object. LAVoN 224 can be used to deposit a single feed material only. In such a case, no feed material is deposited at regions of void in the fabricated object or in regions beyond the fabricate object. Alternatively, each "pixel" of the LAVoN 224 can be served by two TSV 228, each holding one of the two types of feed material. When the TSV 228 for one feed material is turned on, the TSV 228 for the other feed material at that pixel is turned off. The embodiments shown in FIGS. 2B-2D would speed up the deposition process of the feed material on the platen.

Figure 3A:
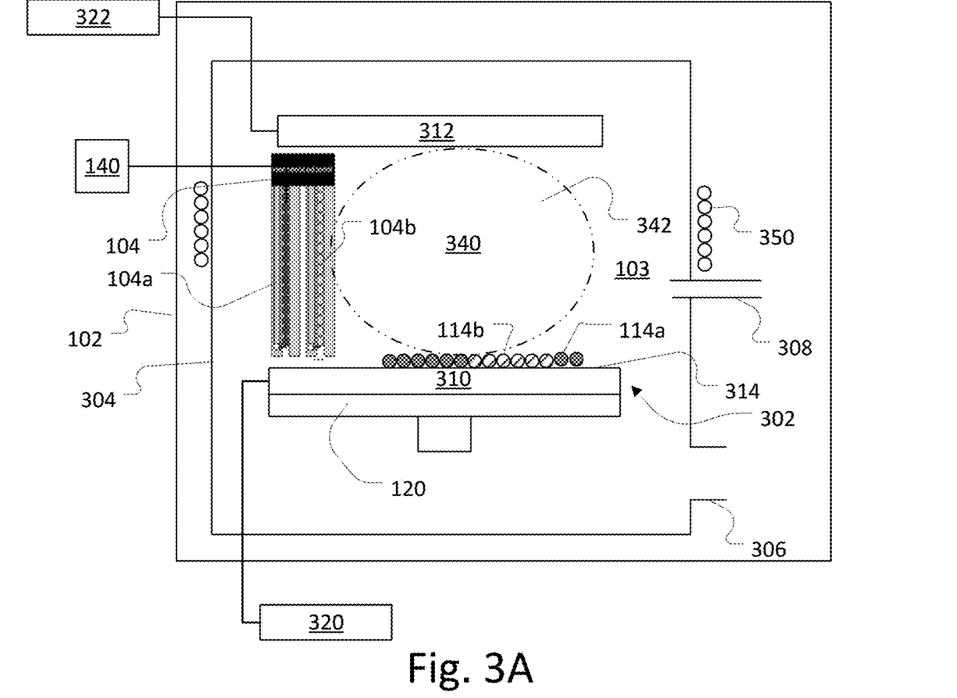
FIG. 3A is a schematic view of an additive manufacturing system.

As an alternative or in addition to the radiative and/or conductive heat sources described for the implementations of FIGS. 1A and 1B, plasma based systems can also be used to achieve layer-wise fusing of feed materials. As shown in FIG. 3A, an additive manufacturing system 300 is similar to the additive manufacturing system 100 of FIGS. 1A and 1B, but includes a plasma generation system 302, which provides a plasma source. The additive manufacturing system 300 includes chamber walls 304 that define the chamber 103.

The plasma generation system 302 includes an electrode 310, i.e., a first electrode. The electrode 310 can be a conductive layer on or in the platen 120. This permits the electrode 310 to can be translated vertically, similar to the piston 132 in FIGS. 1A and 1B. The electrode 310 can serve as the anode.

The additive manufacturing system 300 also include a counter-electrode 312, i.e., as second electrode. The counter-electrode 312 can serve as an anode. Although FIG. 3A illustrates the counter-electrode 312 as a plate suspended in the chamber 103, the counter-electrode 312 could have other shapes or be provided by portions of the chamber walls 304.

At least one of the electrode 310 and/or counter-electrode 312 is connected to an RF power supply, e.g., an RF voltage source. For example, the electrode 310 can be connected to an RF power supply 320 and the counter-electrode can be connected to an RF power supply 322. In some implementations, one of the electrode 310 or counter-electrode 312 is connected to an RF power supply and the other of the electrode 310 or counter-electrode 312 is grounded or connected to an impedance matching network.

By application of an RF signal of appropriate power and frequency, a plasma 340 forms in a discharge space 342 between the electrode 310 and the counter-electrode 312. A plasma is an electrically neutral medium of positive and negative particles (i.e. the overall charge of a plasma is roughly zero). The plasma 340 is depicted as elliptical only for illustrative purposes. In general, the plasma fills the region between the electrode 310 and the counter-electrode 312, excluding a "dead zone" near the anode surface.

Optionally, the system 300 can include a magnet assembly 350 which can create a magnetic field of, for example, 50 Gauss to 400 Gauss. The magnet assembly 350 can include a permanent magnet in the platen 120, e.g., located near a top surface 314 of the platen 120. Alternatively, the magnet assembly can include an electromagnet, e.g., an antenna coil wound about the exterior surface of a dielectric (e.g., quartz) portion of the walls 304 of the vacuum chamber 103. An RF current is passed through the antenna coil. When operated in a resonance mode with the applied RF power, the antenna coil generates an axial magnetic field within the chamber 103. The magnetic field can confine charged particles, e.g., negative particles such as electrons, to a helical motion.

The chamber 103 defined by the chamber walls 304 can be enclosed in the housing 102. The chamber walls 304 can, for example, allow a vacuum environment to be maintained in a chamber 103 inside the housing 102. A vacuum pump in the housing 102 can be connected to the chamber 103 by a vacuum vent 306 to exhaust gases from within the chamber 103. Process gases, such as argon and helium, which are non-reactive, can be introduced into the chamber 103 via a gas inlet 308. Depending on the processes, different gases can be introduced to the chamber 103. For example, oxygen can be introduced to cause chemical reactions.

Figure 2C:
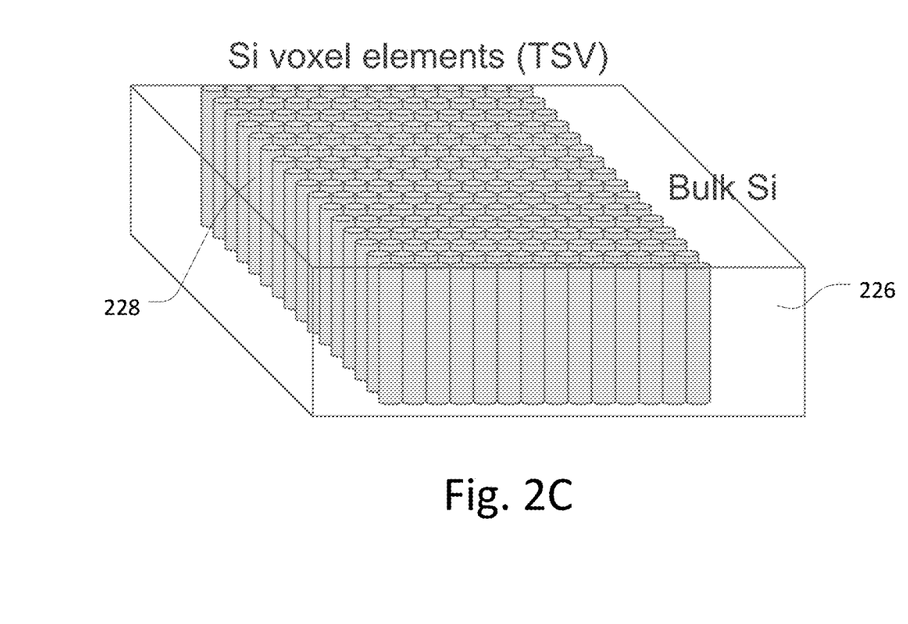
FIG. 2C is a schematic view of an array dispenser.
Figure 2D:
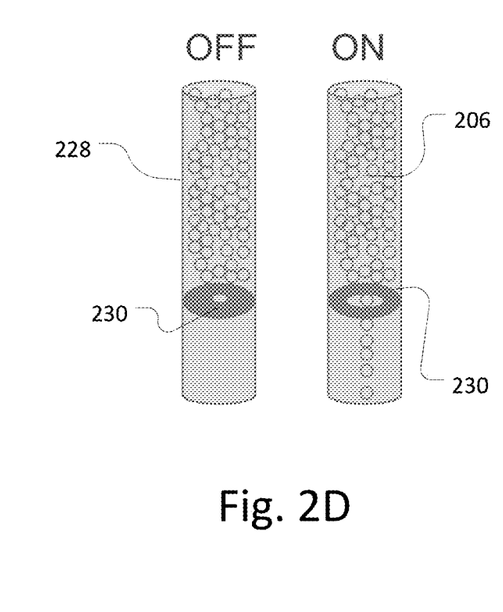
FIG. 2D is a schematic of a through-silicon-via in two different modes of operation.

A dispenser assembly 104, similar to the one shown in FIGS. 1A and 1B, or in alternative forms as those shown in FIGS. 2A-2C, can be used to deposit feed materials 114a and 114b over the platen 120. The controller 140 similarly controls a drive system (not shown), e.g., a linear actuator, connected to the dispenser assembly 104. The drive system is configured such that, during operation, the dispenser assembly is movable back and forth parallel to the top surface of the platen 120.

Figure 3B:
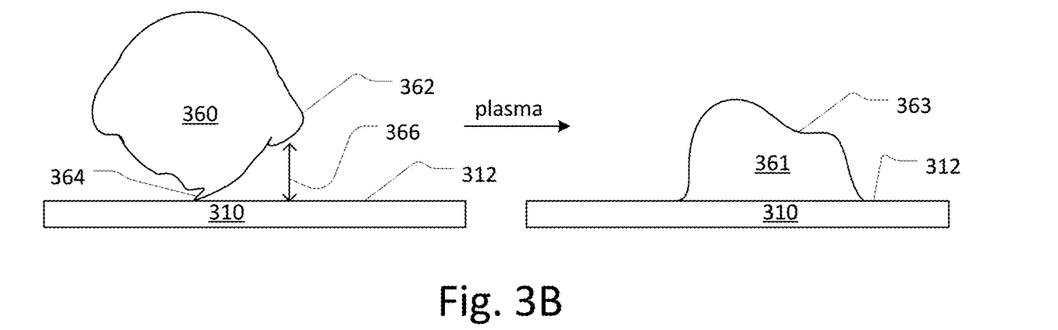
FIG. 3B is a schematic view of a particle on a cathode.

The left side of FIG. 3B shows a profile 362 (exaggerated, not to scale) of a particle 360 of the feed material 114a. The particle 360 is in point contact with the top surface 314 of the electrode 310 or a previously deposited conductive underlying layer that is on the platen 120. In short, with "point contact", due to surface roughness and/or curvature of the particle, only a limited surface area of the particle contacts the top surface 314.

Without being limited to any particular theory, upon applying RF power on the electrode 310 to produce the plasma 340, parts of the particle 360 that are not in direct contact with the top surface 314 can experience a large voltage, e.g., due to plasma bias. The feed material need not be non-metallic or non-conductive to experience the large voltage due to the plasma bias. In the case of a metallic particle conductivity decreases as cross-section decreases. Thus, the point contact basically acts as a resistor for a metallic particle.

Again without being limited to any particular theory, localized arcing across a gap 366 between the particle 360 and either the electrode 310 or underlying conductive layer can cause fusing, e.g., melting or sintering to occur. In general, a larger gap causes a smaller the amount of arcing, for a given voltage differential between the cathode and the particle. Even though the arcing/melting is localized to regions of the particles that are not in direct contact with the cathode, the heat generated by the arcing is sufficient to fuse the material, e.g., by melting the entire particle 360 or sintering of the particle 360 to adjacent particles.

In general, there exists enough curvature (in some (e.g., all) of the particles of the first feed material 114a for arcing to occur. Thus, the particles need not be oriented to be deposited on the cathode in a particular way. The second feed material 114b, which is not fused in the part to be additively manufactured, has a much higher melting point such that even arcing in the plasma would not lead to melting or fusing of the first feed material 114a. For example, the temperature difference in melting point between the first feed material 114a and the second feed material 114b may be greater than 200° C.

The right side of FIG. 3B shows a profile 363 of the particle 360 after it has been fused/melting by localized arcing into a fused particle 361. After fusing, gaps between the particle 361 and the top surface 314 are reduced (e.g., eliminated) to such an extent that local arcing no longer occurs in the fused particle 361.

It should be understood that the above explanation is not limiting. It may be that heating of the layer of feed material is partially or entire due to heat transfer from the plasma, e.g., due to kinetic bombardment.

As described in reference to FIGS. 1A and 1B, the dispenser assembly 104 deposits either the first feed material 114a or the second feed material 114b at locations over the platen 120 according to a printing pattern that can be stored as a computer aided design (CAD)-compatible file that is then read by a computer associated with the controller 140.

Figure 3C:
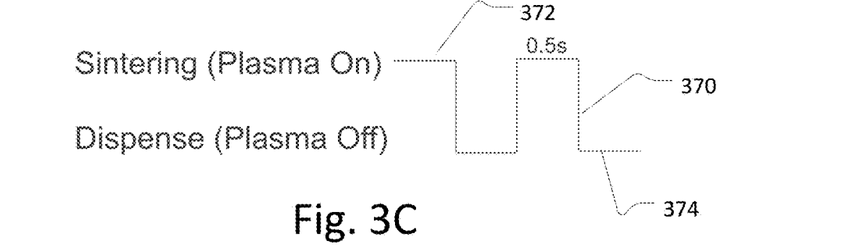
FIG. 3C is a schematic view of driving pulse sequence.

While FIG. 3B shows only a single particle on the electrode 310 for illustration purposes, in practice, an entire layer of feed material is deposited over the platen 120 before the plasma 340 is formed in the system 300. For example, the plasma formation may be timed to a drive pulse 370, as shown in FIG. 3C, that is applied to control a supply of power to the electrode 310 and/or the counter-electrode 330.

During an on-state 372 of the drive pulse 370, the plasma 340 is formed between the electrode and the counter-electrode 330, and localized fusing/melting occurs in the deposited first feed material 114a. During the off-state 374 of the drive pulse 370, the plasma 340 is not formed and the dispenser assembly 104 can be translated across the platen 120 to deposit a new layer of feed material to be processed by the plasma 340. The on-state and the off-state can last, for example, 0.5 seconds.

Similar to the system 100, the system 300 also processes the feed materials 114a and 114b one layer at a time, allowing processing time to scale with L. When a new layer of feed material is deposited on top of a layer of feed material that has been fused/melted, the localized arcing/melting that occurs on the top layer of feed material does not influence the underlying processed or fused/melted layers of feed material. The platen 120 can be lowered after each layer has been processed and fused such that the dispenser assembly 104 need not be translated vertically.

Operating the system 300 under a vacuum environment may provide quality control for the material formed from processes occurring in the system 300. Nonetheless, in some implementations the plasma 340 can also be produced under atmospheric pressure.

A higher frequency (e.g., more than 50 MHz) drive voltage can be applied to one of the electrodes (either the cathode or the anode), while a lower frequency (e.g., less than 20 MHz) bias voltage can be applied to the other electrode. In general, the higher frequency signal creates the flux of plasma. A higher frequency RF drive voltage creates a higher flux (i.e., more ions and electrons in the plasma). The lower frequency RF bias voltage controls the energy of the ions in the plasma. At low enough frequencies (e.g., 2 MHz), the bias signal can cause the ions in the plasma to have enough energy to vaporize a feed material (e.g., aluminum powder) that is deposited on a substrate (e.g., silicon wafer). In contrast, at a higher frequency bias signal (e.g., 13 MHz), melting of the feed material can occur. Varying the RF frequency and point of application would cause different melting performance of the feed material. Melting performance can determine the recrystallization of the feed material, which could lead to different stresses within the metal and different relaxation behavior.

The use of plasma to cause a temperature jump in a layer of feed material also enables layer characteristics of the feed material to be easily controlled. For example, the layer of feed material can be doped by selectively implanting ions from the plasma. The doping concentration can be varied layer by layer. The implantation of ions can help release point stress in the layer of feed material. Examples of dopants include phosphorous.

Indeed, the plasma can be biased such that gaps between the powder particles of the feed material and the electrode cause a sufficiently large voltage to be developed on the powder, causing electron or ion bombardment on the feed material. The electrons or ions used in the bombardment can come from the plasma, and be accelerated to the feed material when either a DC or an AC bias is applied on the feed material. Bombardment can be used to treat a layer, to etch material, to chemically alter (e.g., in reactive ion etch) the feed material, to dope the feed material (e.g., to add a nitride layer), or be used for surface treatment.

Referring to either FIGS. 1A or 3A, the controller 140 of system 100 or 300 is connected to the various components of the system, e.g., actuators, valves, and voltage sources, to generate signals to those components and coordinate the operation and cause the system to carry out the various functional operations or sequence of steps described above. The controller can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

As noted above, the controller 140 can include non-transitory computer readable medium to store a data object, e.g., a computer aided design (CAD)-compatible file, that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 140, e.g., as controlled by firmware or software, can interpret the data object received from the computer to generate the set of signals necessary to control the components of the system to print the specified pattern for each layer.

The processing conditions for additive manufacturing of metals and ceramics are significantly different than those for plastics. For example, in general, metals and ceramics require significantly higher processing temperatures. For example, metals need to processed at temperature on the order of 400° C. or higher, e.g., 700° C. for aluminum. In addition, processing of metal should occur in vacuum environment, e.g., to prevent oxidation. Thus 3D printing techniques for plastic may not be applicable to metal or ceramic processing and equipment may not be equivalent. In addition, the fabrication conditions for large scale-industrial parts can be significantly more stringent.

However, some techniques described here could be applicable to plastic powders. Examples of plastic powders include nylon, acrylonitrile butadiene styrene (ABS), polyurethane, acrylate, epoxy, polyetherimide, polyetheretherketone (PEEK), polyetherketoneketone (PEKK), polystyrene or polyamides.

Certain features that are described in the context of separate embodiments can also be implemented in combination in a single embodiment, and conversely, various features that are described in the context of a single embodiment can also be implemented singly without the other features of that embodiment.

For example, although the description above has focused on the use of multiple feed materials having different temperatures, the technique of raising the temperature of the entire layer or raising the temperature of a linear region that scans across the platen, either by radiated heat or plasma, can be applied even if just a single feed material is being used in each layer. In this case, only a single dispenser assembly is needed. In addition, the controller can cause the dispenser assembly 104 to deliver the single feed material to desired voxels over the platen 120. The object being fabricated can be subject to certain constraints, e.g., each voxel of feed material in a new layer would be deposited only over voxels in the underlying layer where material was delivered.

As another example, although the description above has focused on raising the temperature of the entire layer or raising the temperature of a linear region that scans across the platen, the technique of dispensing multiple feed materials could be used with a heat source that scans across the layer of material to controllably apply heat on a voxel-by-voxel basis. For example, the heat source can be a laser that generates a laser beam that scans across the platen and has an intensity that is modulated to control which voxels are fused. Relative motion of the region heated by the heat source can be provided by holding the platen 120 fixed while the heat source 134 moves, e.g., with a pair of linear actuators, by holding the heat source 134 stationary while the platen 120 moves, e.g., with a pair of linear actuators, or by scanning the beam generated by the heat source, e.g., by a mirror galvanometer.

As another example, although the description above has focused on applying plasma to the entire layer of feed material, plasma could be generated in an area that is smaller than the layer of feed material. For example, the area in which the plasma is generated can be sized to control fusing of a region the layer of feed material, e.g., a single voxel, a region of multiple voxels that does not span the platen, or an elongated region that spans the width of the platen. This region can be scanned across the platen. The region affected by the plasma can be controlled by appropriate configuration of the electrodes, e.g., a counter-electrode of appropriate size can be placed in proximity to the platen. Where voxel-by-voxel control is possible, a continuous layer of a single feed material can be dispensed over the platen, and the plasma can be used to determine whether a particular voxel is fused. Relative motion of the volume in which plasma is generated can be provided by holding the platen 120 fixed while the counter-electrode moves, e.g., with a pair of linear actuators, or by holding the counter-electrode stationary while the platen 120 moves, e.g., with a pair of linear actuators.

As another example, the radiative heat source 134, e.g., an array of heat lamps 135, and the plasma generation system 302 have been described above as part of separate implementations, some implementations can include both the radiative heat source 134 and the plasma generation system 302.

A number of implementations have been described. Nevertheless, it will be understood that various modifications may be made. Accordingly, other implementations are within the scope of the following claims.

What is claimed is:

1. An additive manufacturing system, comprising:
   a platen to support an object to be fabricated;
   a dispenser assembly positioned above the platen, the dispenser assembly including
      a support,
      a first dispenser supported by the support, the first dispenser configured to deliver a first dry powder in a first linear region that extends along a first axis, the first dispenser including
         a first common reservoir to hold the first dry powder,
         a plurality of first openings configured to deliver the first dry powder from the first common reservoir onto the platen, the plurality of first openings coupled to and extending from the first common reservoir and extending along the first axis, and
      a plurality of independently controllable first valves, each valve comprising a movable solid body configured to mechanically gate and independently control flow of the first dry powder through the plurality of first openings,
      a second dispenser supported by the support, the second dispenser configured to deliver a second dry powder in a second linear region that extends parallel to the first linear region and is offset from the first linear region along a second axis perpendicular to the first axis, the second dispenser including
         a second common reservoir to hold the second dry powder,
         a plurality of second openings configured to deliver the second dry powder from the second common reservoir onto the platen, the plurality of second openings coupled to and extending from the second common reservoir and extending along the first axis, and
         a plurality of independently controllable second valves, each valve comprising a movable solid body configured to mechanically gate and independently control flow of the second dry powder through the plurality of second openings;
   a drive system to move the support with the first dispenser and second dispenser moving together along the second axis such that the first linear region and second linear region sweep along the second axis to deposit the first dry powder and second dry powder consecutively along a swath over the platen to form a layer of powder; and
   an energy source configured to selectively fuse one or more voxels of the layer of powder.

2. The system of claim 1, wherein the energy source is configured to generate a beam that is scanned across the platen and is modulated to control which voxels are fused.

3. The system of claim 2, wherein the energy source comprises a laser and the beam is a laser beam.

4. The system of claim 3, comprising a mirror galvanometer to scan the laser beam across the platen.

5. The system of claim 1, comprising a roller movable parallel to a top surface of the platen by a drive system and configured to compact the layer of powder.

6. The system of claim 1, comprising a blade configured movable parallel to a top surface of the platen by a drive system and configured to level the layer of powder.

7. The system of claim 1, comprising a housing enclosing a vacuum chamber, and wherein the platen and dispenser assembly are positioned in the vacuum chamber.

8. The system of claim 1, comprising the first dry powder and the second dry powder, and wherein the second dry powder sinters at a different temperature than the first dry powder.

9. The system of claim 1, wherein the valve is selected from the group consisting of a pneumatic valve, a micro-electromechanical system (MEMS) valve, a solenoid valve and a magnetic valve.

10. The system of claim 1, wherein the plurality of independently controllable first valves and the plurality of independently controllable second valves comprise ultrasonic agitators.

11. The system of claim 1, wherein the drive system is further configured to move the support with the first dispenser and second dispenser moving together along the first axis.

* * * * *